June 11, 1963 W. A. RICHARDS 3,093,791
METHOD AND MEANS USING THERMOELECTRIC COMPARISON
FOR IDENTIFYING CONDUCTIVE MATERIALS
Filed July 5, 1960 2 Sheets-Sheet 1

INVENTOR.
WHITMAN A. RICHARDS
BY
Emery, Booth, Miller + Townsend

ATTORNEYS

INVENTOR.
WHITMAN A. RICHARDS

United States Patent Office 3,093,791
Patented June 11, 1963

3,093,791
METHOD AND MEANS USING THERMOELECTRIC COMPARISON FOR IDENTIFYING CONDUCTIVE MATERIALS
Whitman A. Richards, Cambridge, Mass., assignor to Arklay S. Richards Co., Inc., Newton Highlands, Mass., a corporation of Massachusetts
Filed July 5, 1960, Ser. No. 40,778
7 Claims. (Cl. 324—32)

This invention relates to method and means for analysing or identifying conductors, or conductive materials, and more especially for non-destructively classifying metal articles of unknown composition. The invention aims to provide more particularly a metals analysing instrument or classifier which is compact, lightweight, and economical in its design and construction, and which is capable of easy, rapid, and certain manipulation in use. One feature of the invention is that the apparatus affords rapid thermoelectric comparison with two standard metals, whereby the effective range of the instrument is increased, and its accuracy is improved. Another feature of the invention is that the apparatus may be held and operated for test in one hand alone, leaving the other hand free to manipulate the article of unknown composition. The invention classifier is further advantaged in that its unique design permits a fast reading of the unknown article and with the minimum of warm-up and other adjustment and manipulation.

The invention will be better understood from a consideration of the following specification taken in conjunction with the accompanying drawings in which.

Figure 2:
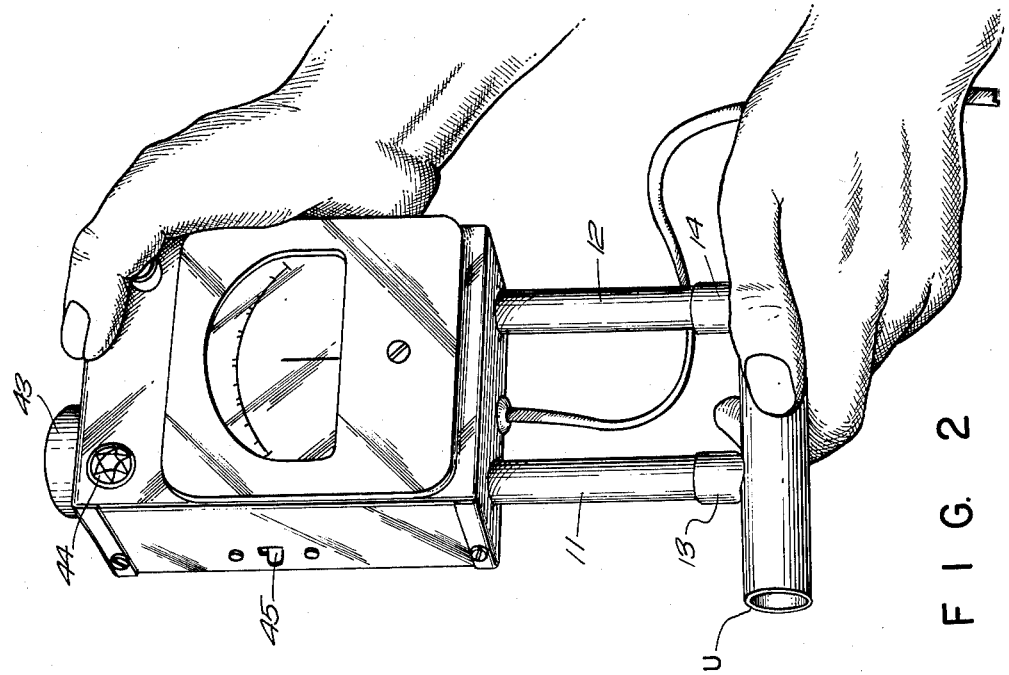
FIG. 2 shows the apparatus in a different perspective and as manipulated in the classifying.

In the illustrated embodiment the invention apparatus or instrument comprises a metal, plastic or other rigid, durable housing or box 10 through one wall of which is rigidly supported a parallel pair of tubular probes or legs 11, 12. The leg 11 is stainless steel and the leg 12 copper, and both are insulated from the housing 10 if that is metal. Surmounting the ends of the tubes are the copper caps or shoes 13, 14 of general cup-like shape and having concave end walls as shown for good conductive contact with the unknown article or sample to be placed thereagainst as hereinafter mentioned.

The metals classifier hereof has a measuring circuit comprising a pair of standard or reference wires 15, 16 of dissimilar composition, for example, C 1008 iron and 310 stainless steel. The standard wires 15, 16 are seen to extend into both legs 11, 12, and to converge at the end of one, herein leg 11, so as to form a point junction or thermocouple 17, which thermocouple junction 17 is soldered or otherwise secured in contact with the inner face and so as to conduct through the shoe 13.

Figure 1:
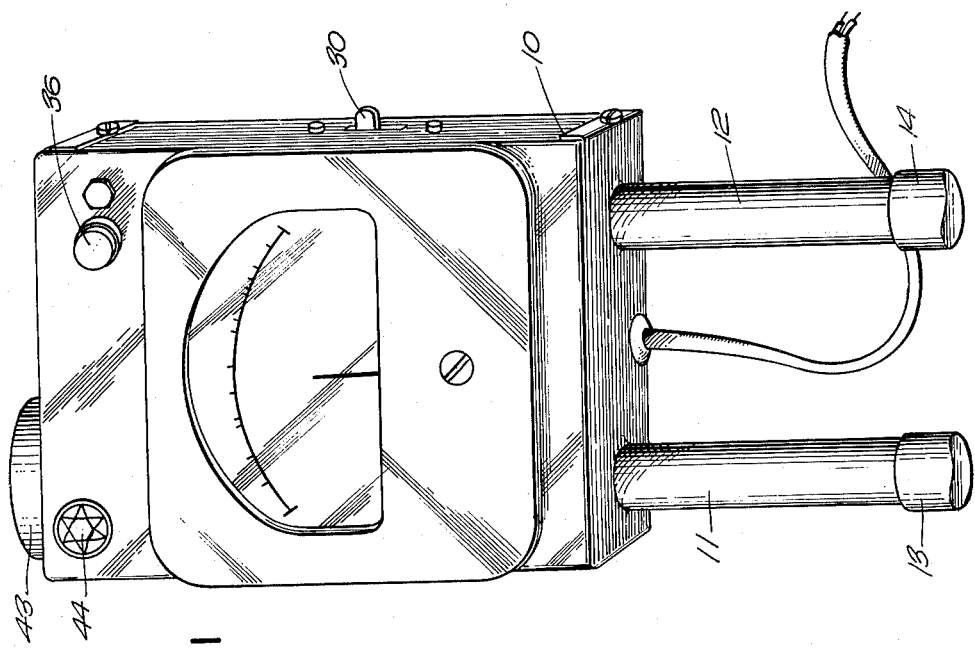
FIG. 1 is an assembly view in perspective of an exemplary embodiment of the invention apparatus.
Figure 3:
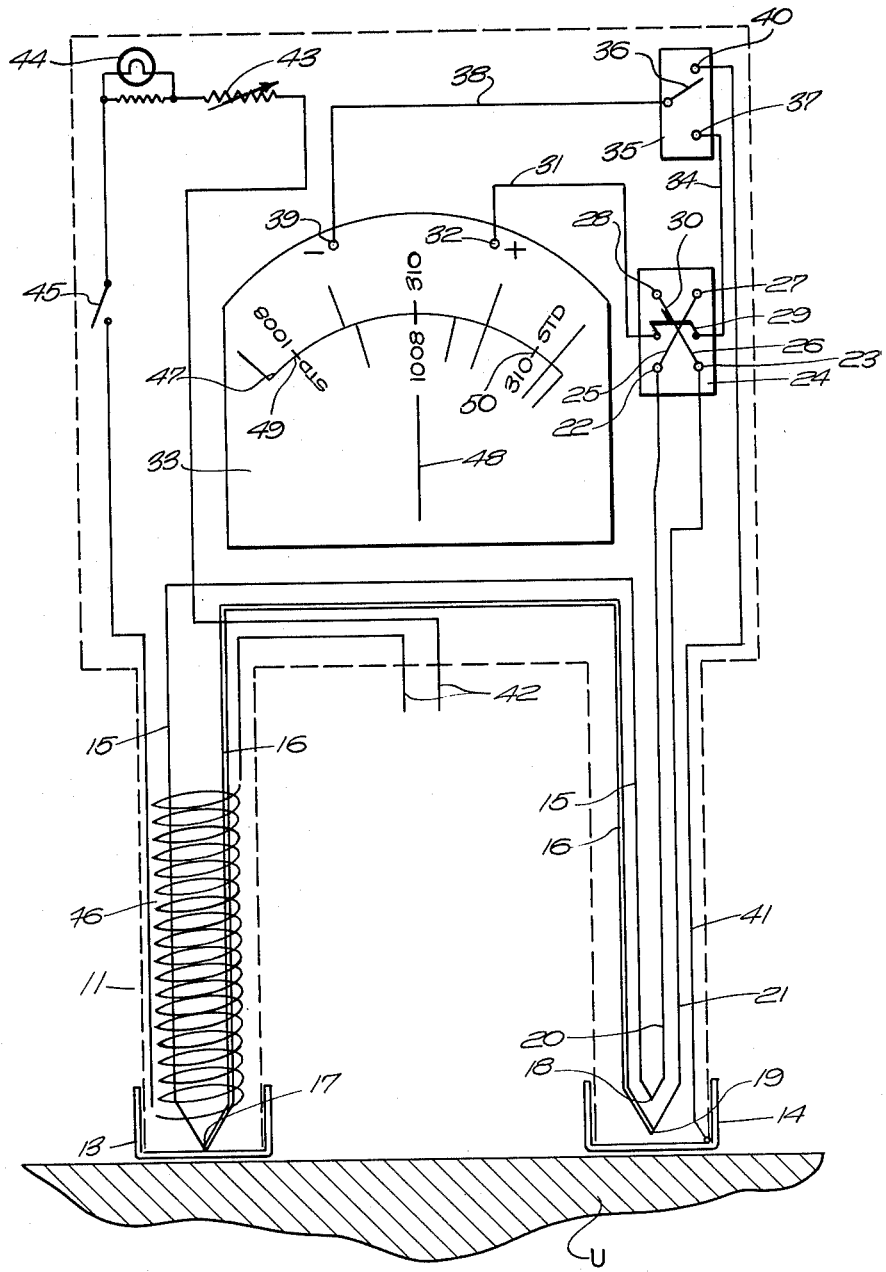
FIG. 3 is a diagrammatic showing of the measuring and heating circuits of the invention.

Near the end of the other leg 12 the wires 15, 16 converge to similar point junctions or thermocouples 18, 19 with copper lead wires 20, 21 which latter are run to one pair of terminals 22, 23 of a switch panel 24. Said terminal pair 22, 23 has reversing connection through crossover wires 25, 26 to an opposing pair of contacts or terminals 27, 28. Mounted intermediate said opposed contact pairs is a double-throw, double-pole toggle switch 29 having a projection or handle 30 extending for convenient manipulation through the housing side wall, FIG. 1, and by which the switch may be oppositely shifted for engagement alternatively with one or the other of said terminal pairs 22, 23 and 27, 28.

The switch 29 is connected at one side and by a lead 31 to one side (shown as positive) or contact 32 of a potential responsive means or galvanometer 33. The switch 29 connects at its other side and through a lead 34 to a switch panel 35 on which is mounted a push button switch 36 projecting through the housing front face, FIG. 1, and normally or spring closed on a contact or terminal 37 to which the lead 34 is also connected. The switch 36 is permanently connected by a wire 38 to the other side (shown as negative) or terminal 39 of the galvanometer 33.

From the foregoing description it will be seen that with the switch 36 closed as normally and by closing the switch 30 on one or the other of contact pairs 22, 23 and 27, 28 there is completed within the instrument a measuring circuit comprising the thermocouple wires 15, 16, the leads 20, 21, and the galvanometer 33, and that by heating junction 17 an electromotive force is generated between the dissimilar standards 15, 16 which is reflected at the galvanometer 33, whose needle will deflect in accordance with the degree of heating. This described internal measuring circuit is disclosed further as reversible, in that the described shifting of the connection of switch 29 from one to the other of said contact pairs serves to reverse the direction or polarity of the circuit, and to shift the galvanometer needle from one side to the other of a center zero scale such as herein shown.

Further in accordance with the invention, the switch 36 may be shifted, as herein by pressing the push button 36, to modify the communicating network so as to comprise a second internal-external measuring circuit. More particularly, pushing button 36 into engagement with a contact 40 mounted opposite contact 37 on panel 35 makes connection with a lead 41 which is run down through the right hand leg 12 and to terminate in conductive contact there with the shoe 14. Thus when a bar or other piece or sample of unknown conductive material is placed against the contacts or shoes 13, 14 and the switch 36 is pressed as just mentioned, a circuit is completed from the galvanometer post 39 through the wire 38, switch 36, contact 40, lead 41 and the unknown to one or the other of thermocouple wires 15, 16, and through that one and the corresponding one of lead wires 20, 21 and also through switch 29 and connecting wire 31 back to the other side 32 of galvanometer 33.

Whichever of the thermocouple wires 15, 16 is included in the internal-external circuit thus made will depend upon the disposition of switch 29, which in its upper position connects lead 31 to contact 28 and hence through crossover wire 26 to lead 21 and through it to the one standard wire 16, and which in its lower position connects lead 31 through contact 22 and lead 20 to the other standard wire 15.

The invention provides also a third or heating circuit which may be connected as through leads 42 to any convenient current source and which comprises also a variable resistor 43, a visual signal means or light 44, an on-off switch 45, and a coil or other cartridge heater 46 arranged in and to heat the leg 11 and particularly the thermocouple wires 15, 16 and their junction 17. The coil 46 is designed with the switch 45 closed to heat the junction 17 to a temperature appreciably above that of the ambient leg 12 and more particularly the junctions 18, 19 and the shoe 14-unknown contact, and the degree of heating may be controlled or adjusted to any desired temperature, or difference in temperature, by manipulation of the resistor 43.

The present invention utilizes for its nondestructive analysis the thermoelectric principle, which is that if dissimilar conductors are connected in a circuit and one of their junctions is heated an electromotive force will be produced which is characteristic of the conductor composition. And that if another conductor of this same composition is substituted for either of the dissimilar conductors in the circuit the same electromotive force will be produced; whereas if a conductor of a different composition is substituted a different electromotive force will be produced which is a function of the difference in composition.

This described thermoelectric effect is utilized in the employment of the invention device for example to separate or sort a batch or bin of pieces or samples of, say, 310 stainless, 304 stainless, Incoloy, and Inconel metals, but whose individual composition is unknown. In this the heating circuit is energized by manipulation of switch 45 to bring or raise hot junction 17 to a standard or reference temperature, meaning a determined interval or differential from the temperature of the ambient junctions 18, 19, and contact 14. It will be appreciated that only a brief warm-up period of, say, two or three minutes is required to accomplish this. With the switch 29 in the appropriate one of its up and down positions, the heating of junction 17 to the standard or reference temperature may then be checked by inspection of the galvanometer scale 47, and more particularly by observing the shift of the galvanometer needle 48 to the appropriate reference mark 49 or 50. With the device held in one hand and with the thumb over button 36 the unknown sample U is then laid across shoes 13, 14 as also therein shown, and the galvanometer 33 is checked to see that the unknown is heated to the extent necessary to return the needle 48 to the standard 49 or 50, following any departure therefrom as may result from cooling of the leg 11 initially upon contact with the unknown.

The button 36 is then pressed to convert the classifier from standard temperature indicating to unknown sample reading, and more particularly to break the wholly internal standard-indicating circuit, and make the unknown-reading circuit through the unknown and one of the thermocouple wires 15, 16. In this internal-external or reading circuit the hot junction is seen as defined at 17 between the unknown U and whichever of the wires 15, 16 is connected through its ambient junction 18, 19, in the circuit comprising also switch 29 and galvanometer 33.

Thus and in accordance with this invention two parallel circuits are provided for reading or classifying the unknown, with two ranges of induced E.M.F. values which may as herein be marked off on opposite sides of a common base line for galvanometer scale 47. In the illustrated embodiment, with the scale switch 29 in the upper position for reading on the upper scale, the unknown U is seen as connected through wire 16, junction 19, lead 21 and wire 26, and with the switch 29 shifted to the lower position for reading on the lower scale the unknown will be connected through the wire 15, junction 18 and lead 20.

If the unknown is the same composition as the standard thermocouple wire with which it is connected the galvanometer needle 48 will of course read on center zero; and where as here the potential responsive means or galvanometer is a center zero device the scale readings of unknown compositions proving to be other than that of the standard may vary across the entire range through the center point as shown.

The different induced potential or E.M.F. values or scale readings for the several compositions of which the unknown pieces in the batch under test consist will also have been determined and marked off on the galvanometer scale in advance. So that whether the unknown composition is the same as or different from that of the standard wire employed in reading it the unknown can be identified or classified by the simple act of observing the relative E.M.F. value which is registered on the galvanometer scale.

The invention device may also be employed advantageously to determine whether unknown pieces are or are not of a given standard composition as may be useful for example for quality control. For this application one of the wires 15, 16 will be selected to be of that standard composition, and the unknown will be connected in circuit with it through the hot junction 17. It will be readily apparent that any impurities in the test samples will be recognized simply as deflections of the galvanometer needle from center zero.

It will be understood that in any application of the device, when good electrical contact of the unknown sample U with the legs 11, 12 has been made, and the hot junction 17 has been restored to the reference temperature, the test readings will be independent of the contact pressure, and the size and shape of the unknown.

The above described selective coupling and reversing connection of the thermocouple wires will be understood to afford the invention device substantial flexibility and adaptability. The parallel arrangement and alternate connection of the wires 15, 16 allows a choice as between two standards in the quality control testing. The circuit may also be arranged to permit replacement or substitution of the legs and thereby a still wider selection of standards. And the two scale switching permits the inclusion within the same galvanometer scale width of up to twice as many standard compositions, as desired for the classification more generally of unknown samples.

My invention is not limited to the particular embodiment thereof illustrated and described herein, and I set forth its scope in my following claims.

I claim:

1. A metals classifier comprising a housing, a pair of legs supported from said housing and providing first and second points of contact with an unknown, a standard indicating circuit including dissimilar standard conductors extending through both said legs and having a plurality of thermocouple junctions, one said junction at one said contact point, means for uniform differential heating of said one thermocouple junction, means for indicating the potential induced in said circuit by said differential heating, an unknown reading circuit including said potential responsive means and means for connecting that to the other said contact and thereby completing a circuit through an unknown applied to both said points of contact, and means manipulable selectively to include one or another of said dissimilar conductors in said unknown reading circuit.

2. A metals classifier having two contact points; a standard indicating circuit providing a plurality of thermocouples and a potential responsive means, one of said thermocouples mounted at one of said contact points; means for differential heating of said one thermocouple; an unknown reading circuit wherein an unknown engaged at both said contact points is connected to said potential responsive means through a thermocouple junction with one side of said heated thermocouple and through a thermocouple at the other of said contact points; and means for alternately making and breaking said standard indicating and unknown reading circuits.

3. Apparatus for the non-destructive analysis of conducting materials of unknown composition comprising means providing two points of contact with the unknown, a standard reading circuit providing dissimilar standard conductors extending in said means and having thermocouple junctions including one in conductive engagement also with one said contact, means for maintaining the temperature of said one junction at a standard differential from the ambient temperature of the other junctions, means for indicating the potential induced in said circuit by said last mentioned means and which is characteristic of the standard conductor compositions, and means for connecting an unknown contacted at said two points in circuit with said potential indicating means and to produce at said indicating means a potential which is characteristic of the unknown composition, said means providing in said circuit a thermocouple junction with said unknown at said other contact point, and said means manipulable to complete the circuit through either of the dissimilar standard conductors forming thermocouple junctions with said unknown at said one contact point.

4. The method of non-destructively analyzing a conductive material of unknown composition with a standard thermocouple and circuit device which comprises differentially heating said thermocouple to a reference temperature, observing the potential thereby generated in said circuit, substituting the unknown conductive material for one of the standard thermocouple conductors in the circuit while manitaining said thermocouple differentially heated at said reference temperature, and observing the potential generated with said unknown conductive material substituted in said circuit.

5. A metals classifier comprising a housing, means carried by said housing and defining two points of contact for engagement by an unknown sample, a pair of dissimilar standard conductors in said housing, said conductors having measuring junction at one said contact point, potential responsive means in said housing, said conductors connected each through a reference junction in standard indicating circuit with said potential responsive means, means for heating said one contact point and measuring junction to produce at said potential responsive means an electromotive force characteristic of the compositions of the standard conductors, unknown reading circuit means connected between said potential responsive means and said other contact point to form a reference junction with an unknown which is engaged at both said contact points to complete the unknown reading circuit through measuring junction with one of the standard conductors at said one contact point, and means for manipulating the connections of said standard conductors and said unknown reading circuit means to said potential responsive means for either standard temperature indicating or unknown sample reading operation of the classifier.

6. The apparatus of claim 5, and means for selecting as between the one and the other of said dissimilar standard conductors for incorporation in said unknown reading circuit.

7. The apparatus of claim 5, and means manipulable to reverse the connection of said standard indicating conductors through said potential responsive means.

References Cited in the file of this patent
UNITED STATES PATENTS

| | | |
|---|---|---|
| 2,750,791 | Hanysz et al. | June 19, 1956 |
| 2,878,669 | Knudson et al. | Mar. 24, 1959 |
| 2,924,771 | Greenberg et al. | Feb. 9, 1960 |